United States Patent
Gustavsson et al.

(10) Patent No.: US 12,428,813 B2
(45) Date of Patent: Sep. 30, 2025

(54) METHOD OF CONTROLLING THE WORKING SCHEME OF AN AUTONOMOUS WORKING MACHINE AT A WORKSITE

(71) Applicant: Volvo Autonomous Solutions AB, Gothenburg (SE)

(72) Inventors: Viktor Gustavsson, Västerås (SE); Johan Sjöberg, Västerås (SE); Erik Uhlin, Eskilstuna (SE); Calle Skillsäter, Torshälla (SE)

(73) Assignee: Volvo Autonomous Solutions AB, Gothenburg (SE)

( * ) Notice: Subject to any disclaimer, the term of this patent is extended or adjusted under 35 U.S.C. 154(b) by 41 days.

(21) Appl. No.: 17/465,063

(22) Filed: Sep. 2, 2021

(65) Prior Publication Data

US 2022/0064902 A1 Mar. 3, 2022

(30) Foreign Application Priority Data

Sep. 3, 2020 (EP) ...................................... 20194303

(51) Int. Cl.
*E02F 9/20* (2006.01)
*G05D 1/00* (2024.01)

(52) U.S. Cl.
CPC ............ *E02F 9/2045* (2013.01); *E02F 9/205* (2013.01); *G05D 1/0016* (2013.01); *G05D 1/0214* (2013.01); *G05D 1/0276* (2013.01)

(58) Field of Classification Search
None
See application file for complete search history.

(56) References Cited

U.S. PATENT DOCUMENTS

| | | | |
|---|---|---|---|
| 4,986,384 A | 1/1991 | Okamoto et al. | |
| 2003/0028323 A1 | 2/2003 | Zeitler et al. | |
| 2012/0098653 A1* | 4/2012 | Slack | G08G 1/163 340/435 |
| 2012/0136524 A1* | 5/2012 | Everett | G05D 1/0291 701/25 |

(Continued)

FOREIGN PATENT DOCUMENTS

| | | |
|---|---|---|
| CN | 106950536 A | 7/2017 |
| CN | 108873904 A | 11/2018 |

(Continued)

OTHER PUBLICATIONS

European Search Report dated Feb. 2, 2021 in corresponding European Patent Application No. 20194303.2, 27 pages.

(Continued)

*Primary Examiner* — Faris S Almatrahi
*Assistant Examiner* — Selena M Jin
(74) *Attorney, Agent, or Firm* — Venable LLP; Jeffri A. Kaminski

(57) ABSTRACT

The invention relates to a method of controlling the working scheme (30, 32) of an autonomous working machine (100) at a work site (1). The method comprises the steps of: determining (S10) the absolute position of a plurality of locations (10) of interest at the work site based on position data from a plurality of position sensors (19) distributed at the work site; generating (S20), by means of a computer, a set working scheme (30) based on the position data; and executing (S30) the set working scheme by the working machine.

17 Claims, 2 Drawing Sheets

(56) References Cited

U.S. PATENT DOCUMENTS

| | | | |
|---|---|---|---|
| 2015/0253776 A1* | 9/2015 | Tojima | G05D 1/0278 |
| | | | 701/50 |
| 2016/0224029 A1* | 8/2016 | Tojima | G05D 1/0297 |
| 2017/0205241 A1* | 7/2017 | Lewis | G07C 5/0816 |
| 2018/0306587 A1 | 10/2018 | Holz | |
| 2018/0348773 A1 | 12/2018 | Hoerster et al. | |
| 2020/0181879 A1* | 6/2020 | Halder | E02F 9/205 |
| 2021/0056654 A1* | 2/2021 | Bellavoine | H04W 4/021 |
| 2021/0099828 A1* | 4/2021 | Hanna | H04W 4/021 |
| 2021/0295460 A1* | 9/2021 | Tamazato | G07C 5/008 |

FOREIGN PATENT DOCUMENTS

| | | |
|---|---|---|
| CN | 209980077 U | 1/2020 |
| WO | 2019185930 A1 | 10/2019 |

OTHER PUBLICATIONS

Chinese Office Action dated May 6, 2023 in corresponding Chinese Patent Application No. 202110983947.9, 20 pages.
Chinese Office Action dated Nov. 23, 2023 in corresponding Chinese Patent Application No. 202110983947.9, 16 pages.
Chinese Decision of Rejection dated Mar. 16, 2024 in corresponding Chinese Patent Application No. 202110983947.9, 17 pages.

\* cited by examiner

METHOD OF CONTROLLING THE WORKING SCHEME OF AN AUTONOMOUS WORKING MACHINE AT A WORKSITE

TECHNICAL FIELD

The present invention relates to a method of controlling the working scheme of an autonomous working machine at a worksite. The invention is applicable on autonomous working machines e.g. within the fields of industrial construction machines and in particular haulers. Although the invention will be described with respect to an autonomous hauler, the invention is not restricted to this particular working machine, but may be used in other construction equipment or in other vehicles, such as wheel loaders, trucks, etc.

BACKGROUND

In connection with transportation of loads at a worksite, e.g. a construction site or a quarry, working machines in the form of haulers, excavators, wheel loaders, trucks or dumpers are frequently used. In its simplest configuration, the working machines are arranged to receive a load in a container or the like arranged on the vehicle at a loading location of the worksite and drive, or otherwise move, to an unloading location of the worksite, where it unloads the carried load. At the unloading location, the loads are taken care of. For example, at a quarry, large stone material transported to the unloading location are further crushed and reduced in size.

Moreover, autonomous operation of the worksite, or at least autonomous working machines operating at the worksite, may be used to improve the efficiency and/or lower the associated costs for the work at the worksite. An autonomous working machine is typically configured to operate in accordance with a working scheme including e.g. loading, transporting the load, and unloading. However, a worksite may be relatively complex, with multiple options for choosing the working scheme of the autonomous working machine. For example, the path between the loading and unloading locations may be subject to objects, such as large blocking elements or holes, which are to be avoided by the autonomous working machine. Moreover, the worksite may evolve as large blocking elements are moved or holes are growing larger, further complicating the process.

Thus, there is a need in the industry for an improved control of the working scheme of autonomous working machines at the worksite.

SUMMARY

An object of the invention is to provide a method for controlling an autonomous working machine in a worksite, which method includes controlling the working scheme of the autonomous working machine.

According to a first aspect of the invention, there is provided a method of controlling the working scheme of an autonomous working machine at a work site. The method comprises the steps of:
  determining the absolute position of a plurality of locations of interest at the work site based on position data from a plurality of position sensors distributed at the work site;
  generating, by means of a computer, a set working scheme based on the position data; and
  executing the set working scheme by the working machine.

Hereby, the control of the autonomous working machine at the worksite is improved, and the working scheme can easily and efficiently be set, or changed, based on the position data of the position sensors. Thus, it should be understood that the working machine operates by e.g. travelling along a path and potentially performing auxiliary actions of work at, or along the path, according to the working scheme. The location of interest could e.g. be a location at which the auxiliary action of work is performed, e.g. loading or dumping a load. Thus, the working scheme may be a pre-programmed sequence of actions e.g. including propelling the autonomous working machine along a path, and loading at one or several locations, transporting the load along at least a sub-portion of the path, and unloading at one or several locations. According to at least one example embodiment, the locations of interest comprises a starting location and a target location, as well as at least one intermediate location between the starting and target location. For such embodiments, the intermediate location may be the above-mentioned location at which the auxiliary action of work is performed, or a location which are to be avoided, e.g. a hole or a hill.

According to at least one example embodiment, the position sensors are manually movable position sensors which can be placed by hand at a respective location of interest.

Hereby, the position sensors, and thus the position data, is easily and efficiently distributed at the worksite at the desired locations of interest. Moreover, by using manually movable position sensors, the positions sensors can easily be repositioned and replaced as a response to a desire to change, or modify, the working scheme. It should be understood that the term "place by hand" is not necessarily limited to an operator physically placing the position sensors at the location of interest, but that the position sensors rather are configured to be manually distributed and placed at will at the work site, and that they may be placed by a vehicle or a robot or the like, maneuvered by an operator.

According to at least one example embodiment, the working scheme of the working machine is governed by a working site process under given work site conditions, and wherein the step of generating is carried out in response to a change in working site process and/or a change in work site conditions.

Thus, by the method of the invention, external factors influencing the operation of the autonomous working machine can efficiently be taken into account, and the working scheme can be adapted and updated accordingly. The working site process may for example include the overall process of the work site, e.g. including the working schemes of a plurality of working machines, and/or locations at which auxiliary actions of work are to be performed (e.g. loading or unloading). The work site conditions may for example include topography and topology characteristics, road and/or ground conditions, etc. Thus, the change may be a change in working site process, such as e.g. a change in loading or unloading location, and/or a change in the work site conditions, such as e.g. a change in topography.

According to at least one example embodiment, the method further comprises the steps of:
  providing, for the autonomous working machine, a predefined working scheme based on a first working site process at a first work site condition;
  receiving a change in working site process resulting in a second working site process and/or receiving a change in work site condition resulting in a second work site condition, wherein the change is represented by at least one of the plurality of locations of interest and position data from the plurality of position sensors distributed at the work site, such that the set working scheme is based on at least one of the second working site process and the second work site condition.

Thus, the set working scheme can be updated from a predefined working scheme based on a change of the locations of interest, and corresponding change of the position sensors, thus providing an easy and effective way of responding to a change in working site process and/or a change in work site conditions. Starting and target locations may be the same for the predefined working scheme and the set working scheme, but a sub-portion in between, such as e.g. an intermediate location, may differ between the two working schemes.

Stated differently, and according to at least one example embodiment, the work site is subject to changes resulting in a work site with varying conditions, the method comprising the steps of adapting the working scheme of the autonomous working machine in response to the varying conditions.

According to at least one example embodiment, the change is a pre-defined variation to the working scheme based on the location of the position sensors. The working scheme may be a predefined working scheme as described above.

According to at least one example embodiment, the working scheme of the working machine comprises a path for the working machine to follow at the work site, and/or an auxiliary action for performing work of the working machine at the work site, wherein the step of generating comprises including a change in path and/or auxiliary action in the set working scheme.

Hereby, changes to the work site conditions can be easily implemented to the working scheme of the autonomous working machine. For example, the change in path may be due to more favorable road conditions and/or in order to reduce the overall energy consumption of the autonomous working machine, e.g. due to a shorter distance of the load carrying travel.

According to at least one example embodiment, the position sensors comprises one or more of the following: a GPS sensor, a triangulation based position sensor, a LIDAR, an interference sensor, or other ranging and positioning sensor.

Such position sensors may be well integrated into a manually movable position sensor, and e.g. be arranged on a stick or the like in order to place the position sensors by hand at the location of interest. For example, in case of an interference sensor, each interference sensor can e.g. be moved by hand to a recording position adjacent to a respective location of interest.

According to at least one example embodiment, the method further comprises combining the position data from the plurality of position sensors with a map matching algorithm to determine the absolute position of the plurality of location of interest.

Thus, the accuracy, and/or the information content of the absolute position of the location of interest can be improved.

According to at least one example embodiment, the plurality of locations of interest comprise an auxiliary action performing location, such as e.g. a loading location and/or an unloading location for the working machine.

Thus, the auxiliary action of performing work may include loading, load carrying travel, and/or unloading, but may alternatively or additionally include digging, crushing, drilling, or the like. The change in auxiliary action may thus include a change in the operation of the auxiliary action and/or a change in the position of where the auxiliary action is performed.

According to at least one example embodiment, the plurality of locations of interest comprises a location to be avoided by the working machine.

Hereby, the working scheme can include specific information of locations which are to be avoided, and e.g. the path of the autonomous working machine can be adapted accordingly. The location to be avoided may e.g. be a hole, an uphill portion, a blocking element, or another working machine.

According to at least one example embodiment, at least one of the position sensors is attached to a movable object at the work site.

Hereby, the working scheme may include specific information of objects which are movable. Typically, the working scheme, or the configuration of how the autonomous working machine executes the working scheme, includes acquiring current position of the movable object and adapting the operation of the working scheme accordingly (e.g. if the movable object is another working machine which is to be avoided, or if the movable object is another working machine which is to be interacted with, e.g. to receive a load from the autonomous working machine). According to one example embodiment, as soon as the movable object changes its position (i.e. moves), the steps of the method is regenerated and executed in order to update the working scheme of the autonomous working machine.

According to at least one example embodiment, the method further comprises:
  presenting, by means of a computer, a graphical user interface of the work site and the plurality of locations of interest;
  receiving, by means of the computer, a manual input associated with an intended working scheme of the working machine;
wherein the step of generating comprises generating the set working scheme for the working machine at least partly based on the manual input.

Herby, a simple and efficient way to supply input data for generating the set working scheme is provided. An operator may thus manually supply input data based on the position data provided in the graphical user interface as visual reference or constraints, and thereby decide upon the intended working scheme. The intended working scheme is then used as input for generating the set working scheme.

According to at least one example embodiment, the step of generating may comprise utilizing an automatic working scheme planning algorithm.

Thus, instead of making manual input using a graphical user interface, the set working scheme can be automatically generated based on the position data. Typically, safety parameters and vehicle limitation are also included as boundary conditions and constraints for the set working scheme.

According to at least one example embodiment, the work site is a confined area, and the absolute positions of the plurality of locations of interest comprise global or local locational data, for example in a form of degrees of longitude, degrees of latitude and elevation.

Hereby, a simple and effective means for enabling absolute position of the location of interest is provided. The local locational (position) data may e.g. be based on a grid system in an x, y, z coordinate system (e.g. by using a cartesian coordinate system, cartesian data or radial data). The absolute positions may be unique global data, for example in a form of degrees of longitude, degrees of latitude and elevation. Absolute position is different to relative positions referring to a local reference point, e.g. the relative distance between the autonomous working machine and the position sensor.

According to at least one example embodiment, the plurality of position sensors is distributed at the plurality of locations of interest at the work site.

Thus, the absolute position of the position sensor corresponds to, or is equal to, the absolute position of the locations of interest. It should be understood that the position sensors are typically manually moved to the location of interest, and then fixed in its position (i.e. fixed in an absolute position, with the exception if the position sensor is attached to a movable object) during the generation of the working scheme. Thus, the position sensors are typically not moving during the generation of the working scheme.

According to at least one example embodiment, a plurality of position sensors is used to form a boundary, or define a single object, corresponding to a location of interest. Such boundary may alternatively be created by a single position sensor moved from one location of interest to another location of interest.

Thus, a sub-set of position sensors may be used for a single location of interest (e.g. a large hole, or a large blocking element), wherein the sub-set of position sensors are interconnected so as to form a boundary around at least a part of the location of interest. By using a plurality of such sub-sets of positions sensors, a plurality of locations of interest may be defined accordingly. The boundary may e.g. form a closed curve including at least a part of the location of interest.

According to at least one example embodiment, the method further comprises manually positioning the plurality of position sensors at the work site.

As mentioned previously, manually positioning of the position sensors provides a simple and yet effective means for supplying position data input to the working scheme.

According to a second aspect of the present invention a computer program is provided. The computer program comprises program code means for performing the steps of the first aspect of the invention, when the program is run on a computer.

According to a third aspect of the present invention a computer readable medium carrying a computer program is provided. The computer readable medium carrying a computer program comprising program code means for performing the steps of the first aspect of the invention, when the program is run on a computer.

Effects and features of the second and third aspects of the invention are largely analogous to those described above in connection with the first aspect of the invention.

According to a fourth aspect of the present invention, an autonomous working machine is provided. The autonomous working machine comprises a computer program according to the second aspect of the invention, or a computer readable medium carrying a computer program according to the third aspect of the invention.

The working machine may further comprise a memory, and the memory may be configured to store historical data relating to the predefined working scheme, e.g. including a travelled path of the autonomous working machine and potential any auxiliary actions of performing work. Moreover, the autonomous working machine typically further comprises means for operating the autonomous working machine, such as a motor or engine for propelling the autonomous working machine and potentially a battery for energizing the motor, and potentially an auxiliary equipment configured to perform work, i.e. to perform an auxiliary action, such as digging or loading.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples. In the drawings.

DETAILED DESCRIPTION OF EXAMPLE EMBODIMENTS OF THE INVENTION

Figure 1:
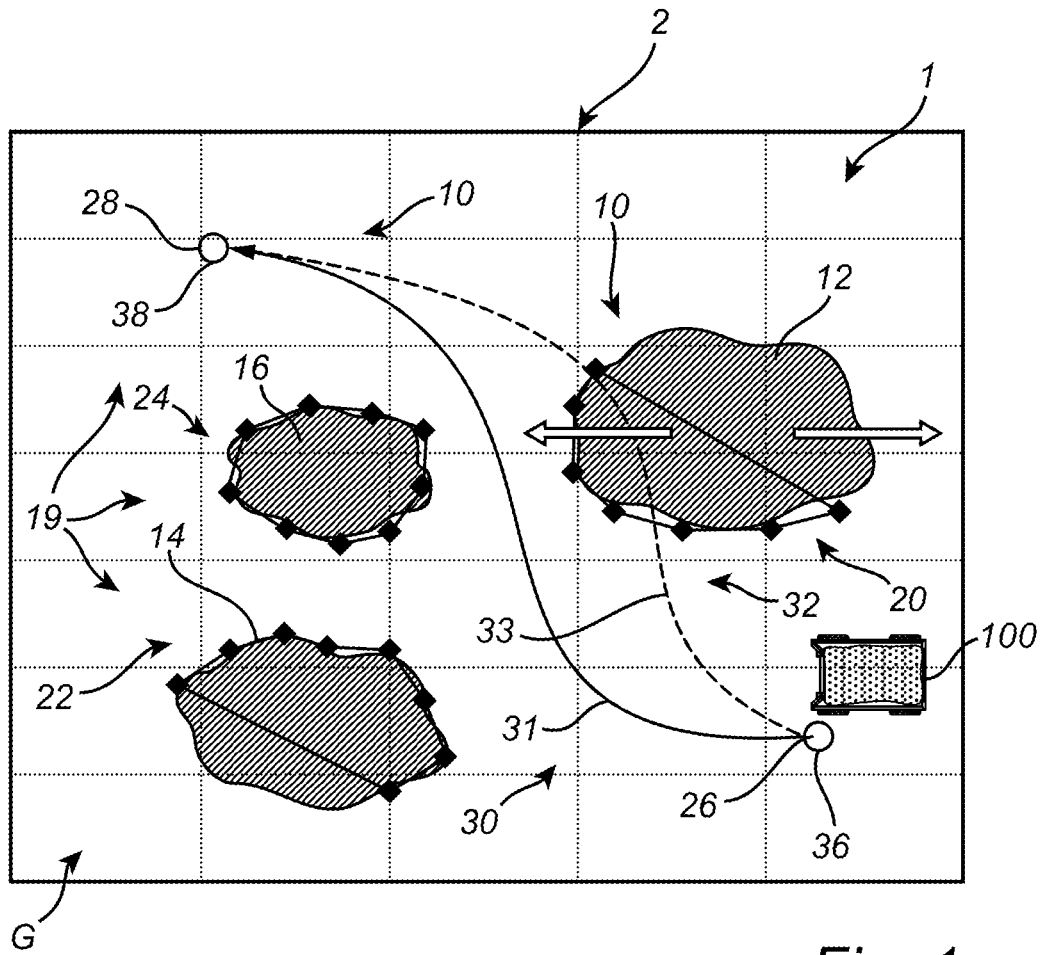
FIG. 1 is a schematic top view of a worksite in which an autonomous working machine in the form of an autonomous hauler is controlled to operate according to an embodiment of the invention.

The present invention will now be described more fully hereinafter with reference to the accompanying drawings, in which exemplary embodiments of the invention are shown. The invention may, however, be embodied in many different forms and should not be construed as limited to the embodiment set forth herein; rather, these embodiments are provided for thoroughness and completeness. Like reference character refer to like elements throughout the description. In the present detailed description, various embodiments of the method according to the present invention are mainly discussed with reference to an autonomous hauler carrying a load from a loading location to an unloading location at a worksite. It should be noted that this by no means limits the scope of the present invention which is equally applicable to a wide range of different autonomous working machines, operating between a starting location and target location.

FIG. 1 is a schematic, top view of a worksite 1 in which an autonomous working machine 100, here an autonomous hauler 100, operates. The worksite 1 comprises various locations 10 of interest for the autonomous hauler 100, and more specifically a first object 12, a second object 14, a third object 16, a starting or loading location 36 and a target or unloading location 38. Thus, the autonomous hauler 100 is configured for auxiliary action of performing work, such as loading at the loading location 36, carrying the load along the path 31, and unloading at the unloading location 38. In FIG. 1, the positions of the location of interest are to various extent marked, or defined, by a plurality of position sensors 19. In more detail, the first object 12 is associated with a first sub-set 20 of the position sensors, the second 14 is associated with a second sub-set 22 of the position sensors and the third object 16 is associated with a third sub-set 24 of position sensors. Each one of the three sub-sets 20, 22, 24 forms a boundary, or closed curve, around at least a part of the respective object 12, 14, 16. The first, second and third objects 12, 14, 16 are in FIG. 1 obstacles which are to be avoided by the autonomous hauler 100, and the first object is a movable object 12 which may move in accordance with the double arrow. Moreover, the loading location 36 is associated with a starting position sensor 26, and the unloading location 38 is associated with a target position sensor 28.

Thus, as will be described in more detail with reference to FIG. 3, the position, or absolute position, of the plurality of locations 10 of interest at the work site 1 may be based on position data from the plurality of position sensors 19 distributed at the work site 1. Hereby, the autonomous hauler 100 may be controlled at the worksite 1 to operate in accordance with a working scheme 30, which working scheme 30 is generated based on the position data. In other words, the position data of the locations 10 of interest are used to generate a set working scheme 30 for which the autonomous hauler 100 is to be operated with. In FIG. 1, the set working scheme 30 defines the starting or loading location 36 with the starting position sensor 26, and the target or unloading location 38 with the target position sensor 28, and between the loading location 36 and the unloading location 38, a set path 31 is defined based on the first, second and third sub-sets 20, 22, 24 of the position sensors associated with first, second and third objects 12, 14, 16 (i.e. obstacles which are to be avoided). That is, the set path 31 is set as an appropriate path between the loading and unloading locations 36, 38, while avoiding interaction with the first, second and third objects 12, 14, 16.

As is clear from FIG. 1, the first and second objects 12, 14 are only partly surrounded by the first and second sub-sets 20, 22, of the position sensors respectively, while the third object 16 is completely surrounded by the third sub-set 24 of the position sensors. Moreover, the portion of the first and second objects 12, 14 which are provided with the position sensors are forming a respective boundary facing the set path 31. Thus, by providing only a portion of the objects with position sensors, typically the portion of the object which are facing the set path 31, installation time of the position sensors, and equipment can be saved.

The work site 1 may be subject to changes resulting in a work site with varying work site conditions. Additionality or alternatively, the autonomous hauler 100 may be governed by a working site process, including interaction and cooperation with other working machines at the work site 1, which working site process may be subject to a change. According to at least one example, the autonomous hauler 100 is configured to execute an initial, or predefined working scheme 32 including the previously mentioned loading location 36 and unloading location 38, and a predefined path 33 for which the autonomous hauler 100 should travel in order to avoid the first, second and third objects 12, 14, 16. Note that for the predefined working scheme 32, the first object 12 being a movable object, is positioned to the far right of the double arrow so that the predefined path 33 is free of encountering the first object 12. Subsequently, a change in the working site conditions, here being that the first object 12 is moved along the double arrow to the far left, demands for a change in path as the predefined path 33 now is blocked by the first object 12. Hereby, the initial, or first, working site condition with the first object 12 being arranged to the far right of the double arrow is changed into a second working site condition with the first object 12 being arranged to the far left of the double arrow. Thus, as the first sub-set 20 of position sensors are associated with the first object 12, and typically attached to the first object 12, the change in the working site conditions when the first object 12 moves, is represented by a change of position of the positions sensors in the first sub-set 20. Hereby, a new working scheme 30, represented by the previously mentioned set working scheme 30 in FIG. 1, including a set path 31 which guides the autonomous hauler 100 not to encounter the first object 12, is generated and executed by the autonomous hauler 100. Note that the first object 12 may instead of being a reciprocally movable obstacle be a hole, which boundaries are moving as the hole grows larger.

As an alternative, the first object 12 may not be an obstacle, but rather an unloading location which grows bigger over time. In such cases, a change in the working site process is initiated as the unloading location reaches a certain limiting size, and the unloading location may be moved to e.g. the indicated spot 38 in FIG. 1. In such cases, the change is included as a change in the working site process but also a change in the auxiliary action of performing work as the position of unloading changes from the first object 12 to the indicated spot 38 in FIG. 1.

As seen in FIG. 1, the work site 1 is a confined area with boundaries 2, and the absolute positions of the locations 10 of interest are defined by a local locational data, here in the form of a grid G with 7×5 squares. As the position sensors 19 are distributed at the plurality of locations 10 of interest at the work site 1, the position of each positions sensor 19 is defined by the grid G. Obviously, the resolution of the grid G with 7×5 squares is only exemplifying, and finer (or coarser) grid is within the scope of the invention. Alternatively, the locations 10 of interest are defined by a global locational data, for example in a form of degrees of longitude, degrees of latitude and elevation. Thus, the position of each positions sensor 19 may be defined by degrees of longitude, degrees of latitude and elevation.

Figure 2:
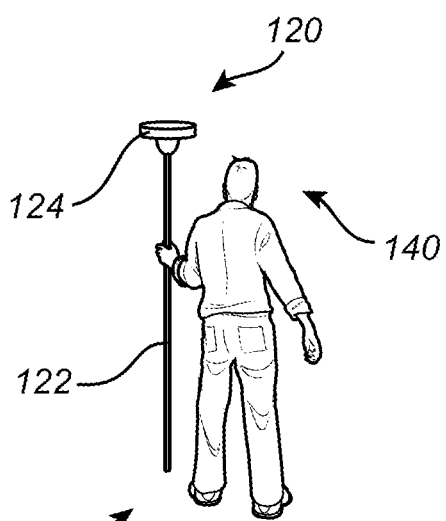
FIG. 2 is a view of a position sensor which may be used in accordance with embodiments of the invention.

Turning to FIG. 2, showing an example of a position sensor 120, which may be used for the position sensors 19 of FIG. 1, and an operator 140 manually placing the positions sensor 120 at a spot 110, e.g. being one of the locations 10 of interest of FIG. 1. The position sensor comprises a rod 122 or stick 122, to which a sensor module 124 is connected. The stick 122 is preferably sharp at the opposite end to the where the sensor module 124 is arranged for facilitating insertion of the position sensor 120 into the ground. Instead of a stick 122, the sensor module 124 may be connected to an element which facilitate attachment to an obstructing element, such as e.g. a large rock or another working machine. The sensor module 124 may e.g. be a GPS sensor, a triangulation based position sensors, a LIDAR or other interference sensor. By the configuration of the position sensor 120 of FIG. 2, it may be manually moved and placed by hand at a location 110 of interest.

Figure 3:
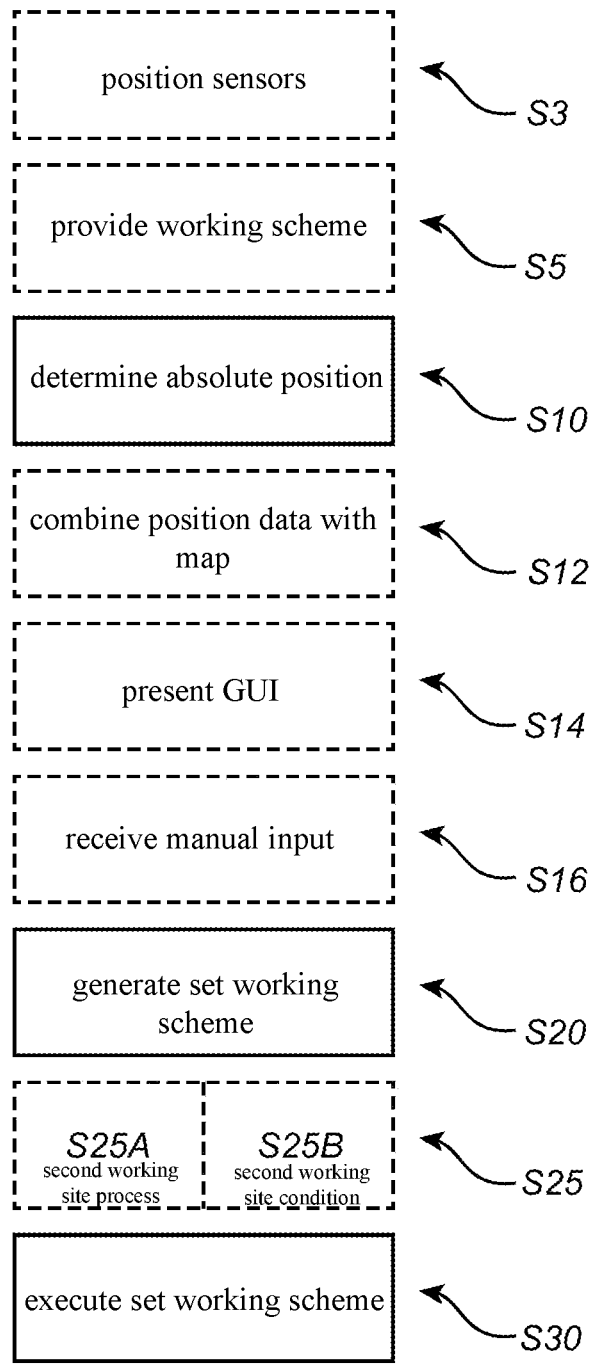
FIG. 3 is a flow chart outlining the general steps of a method according to an embodiment of the invention.

FIG. 3 is a flow chart describing the steps in accordance with an embodiment of controlling the working scheme of an autonomous working machine at a work site. For example, the method may be applied to control the working scheme 30, 32 of the autonomous hauler 100 at the work site 1 of FIG. 1, why reference is additionally made to features presented in FIG. 1 in the steps of the method below. Optional steps in FIG. 3 is indicated by dashed boxes. Preferably, at least some of the steps of the method is provided by a computer program, or computer readable medium carrying a computer program. The computer program comprising program code means for performing the steps of the method described with reference to FIG. 3, when the program is run on a computer, e.g. a hardware resource of the autonomous working machine 100. Thus, the autonomous hauler 100 of FIG. 1 may comprise such computer readable medium carrying a computer program.

In a step S3, a plurality of position sensors 19 are manually positioned at the work site 1.

In a step S5, the autonomous working machine 100 is provided with a predefined working scheme 32 based on a first working site process at a first work site condition, as described with reference to FIG. 1. The predefined working scheme 32 typically comprises a path 33, or predefined path 33, for the working machine 100 to follow at the work site 1, and/or an auxiliary action for performing work, such as loading at the loading location 36, unloading at the unloading location 38, and carrying the load during travel along the path 33.

In a step S10, the absolute position of a plurality of locations 10 of interest at the work site 1 is determined based on position data from a plurality of position sensors 19 distributed at the work site 1.

In a step S12, the position data from the plurality of position sensors 19 is combined with a map matching algorithm to determine the absolute position of the plurality of location 10 of interest.

Depending on the position sensor used (e.g. depending on the sensor module 124 of FIG. 2), the map matching algorithm may be used to provide the absolute position of the respective position sensor 19. Moreover, the accuracy of such positioning may be improved.

In a step S14, a graphical user interface of the work site 1 and the plurality of locations 10 of interest is presented by means of a computer. Thus, the view in FIG. 1 may be a graphical user interface for an operator.

In a step S16, a manual input associated with an intended working scheme of the working machine 100 is received by means of the computer.

Thus, the operator may, based on the locations 10 of interest visualized by the graphical user interface, manually make an input to define the intended working scheme, which may, after e.g. a check that the intended working scheme fulfils safety parameters and vehicle limitations, become the set working scheme 30.

In a step S20, a set working scheme 30 is generated by means of a computer, based on the position data. With regards to step S16, the step S20 may comprise generating the set working scheme 30 for the working machine 100 at least partly based on the manual input (which indirectly is based on the position data).

As described with reference to FIG. 1, the working scheme 30 of the working machine 100 may be governed by a working site process under given work site conditions, and the step S20 may be carried out in response to a change in working site process and/or a change in work site conditions. For example, the step S20 may comprise a change in path, from the predefined path 33 to a set path 31, and/or a change in auxiliary action. Moreover, the change may be carried out subsequent to the step S20, and the method may comprise a step S25A, wherein the change in working site process results in a second working site process and/or a step S25B wherein the change in work site condition results in a second work site condition. The change is represented by a change in at least one of the plurality of locations 10 of interest and position data from the corresponding position sensors 20, 22, 24, 26, 28 distributed at the work site 1.

Thus, the set working scheme 30 is based on at least one of the second working site process and the second work site condition. It should be noted that the steps S25A and S25B may alternatively be performed prior to step S20, i.e. prior to the generation of the set working scheme 30.

In a step S30, the set working scheme 30 is executed by the working machine 100. This typically involves hardware and software resources of the autonomous working machine, as well as the propelling means.

It should be understood that the autonomous working machine 100 is typically equipped with hardware and software resources known to the skilled person, e.g. associated hardware resources such as e.g. processing units being provided in the form of one or more processors together with process software including computer program memory including computer program code for performing the method of the invention.

It is to be understood that the present invention is not limited to the embodiments described above and illustrated in the drawings; rather, the skilled person will recognize that many changes and modifications may be made within the scope of the appended claims.

The invention claimed is:

1. A method of controlling the working scheme of an autonomous working machine at a work site, the method comprising the steps of:
   determining the absolute position of a plurality of locations of interest at the work site based on position data from a plurality of position sensors distributed at the work site, the plurality of locations of interest comprising a location to be avoided by the working machine, and wherein the plurality of position sensors is distributed at the plurality of locations of interest at the work site;
   generating, by means of a computer, a set working scheme based on the position data; and
   executing the set working scheme by the working machine, wherein the working scheme of the working machine is governed by a working site process under given work site conditions,
   wherein the step of generating is carried out in response to a change in working site process and/or a change in work site conditions when the change in working site process and/or the change in work site conditions is a change in position of the location to be avoided.

2. The method according to claim 1, wherein the position sensors are manually movable position sensors which can be placed by hand at a respective location of interest.

3. The method according to claim 1, further comprising the steps of:
   providing, for the autonomous working machine, a predefined working scheme based on a first working site process at a first work site condition; receiving a change in working site process resulting in a second working site process and/or receiving a change in work site condition resulting in a second work site condition, wherein the change is represented by at least one of the plurality of locations of interest and position data from the plurality of position sensors distributed at the work site, such that the set working scheme is based on at least one of the second working site process and the second work site condition.

4. The method according to claim 3, wherein the working scheme of the working machine comprises a path for the working machine to follow at the work site, and/or an auxiliary action for performing work of the working machine at the work site, wherein the step of generating comprises including a change in path and/or auxiliary action in the set working scheme.

5. The method according to claim 1, wherein the position sensors comprise one or more of the following: a GPS sensor, a triangulation based position sensors, a LIDAR.

6. The method according to claim 1, further comprising combining the position data from the plurality of position sensors with a map matching algorithm to determine the absolute position of the plurality of location of interest.

7. The method according to claim 1, wherein at least one of the position sensors is attached to a movable object at the work site.

8. The method according to claim 1, further comprising: presenting, by means of a computer, a graphical user interface of the work site and the plurality of locations of interest; receiving, by means of the computer, a manual input associated with an intended working scheme of the working machine; wherein the step of generating comprises generating the set working scheme for the working machine at least partly based on the manual input.

9. The method according to claim 1, wherein the work site is a confined area, and wherein the absolute positions of the plurality of locations of interest comprise global or local locational data.

10. The method according to claim 1, further comprising manually positioning the plurality of position sensors at the work site.

11. A non-transitory computer readable medium carrying a computer program comprising program code for performing a method of claim 1 when the program code is run on a computer.

12. An autonomous working machine comprising the non-transitory computer readable medium carrying a computer program according to claim 11.

13. The method according to claim 1, wherein the position sensors are fixed in position at the location of interest during the generation of the set working scheme based on the position data.

14. The method according to claim 1, wherein the location to be avoided is a movable object at the work site.

15. A method of controlling the working scheme of an autonomous working machine at a work site, the method comprising the steps of: determining the absolute position of a plurality of locations of interest at the work site based on position data from a plurality of position sensors distributed at the work site, the plurality of locations of interest comprising a location to be avoided by the working machine, and wherein the plurality of position sensors is distributed at the plurality of locations of interest at the work site; generating, by means of a computer, a set working scheme based on the position data; and executing the set working scheme by the working machine, wherein the working scheme of the working machine is governed by a working site process under given work site conditions, and wherein the step of generating is carried out in response to a change in working site process and/or a change in work site conditions when the change in working site process and/or the change in work site conditions is a change in position of the location to be avoided, wherein the plurality of position sensors is used to form a boundary corresponding to the location of interest, the location of interest being only partly surrounded by the plurality of positions sensors.

16. The method according to claim 15, wherein a portion of the location of interest provided with the position sensors forming the boundary is facing a set path of the set working scheme.

17. A method of controlling the working scheme of an autonomous working machine at a work site, the method comprising the steps of: determining the absolute position of a plurality of locations of interest at the work site based on position data from a plurality of position sensors distributed at the work site, the plurality of locations of interest comprising a location to be avoided by the working machine wherein the plurality of position sensors is distributed at the plurality of locations of interest at the work site; generating, by means of a computer, a set working scheme based on the position data, the position sensors being fixed in position at the location of interest during the generation of the set working scheme based on the position data; and executing the set working scheme by the working machine, wherein the working scheme of the working machine is governed by a working site process under given work site conditions, and wherein the step of generating is carried out in response to a change in working site process and/or a change in work site conditions when the change in working site process and/or the change in work site conditions is a change in position of the location to be avoided.

* * * * *